United States Patent [19]
Bartholomew

[11] Patent Number: 5,437,655
[45] Date of Patent: Aug. 1, 1995

[54] AIR INLET FILTER FOR BURETTE TOP

[75] Inventor: Joel Bartholomew, Danielsville, Pa.

[73] Assignee: B. Braun Medical Inc., Bethlehem, Pa.

[21] Appl. No.: 115,634

[22] Filed: Sep. 3, 1993

[51] Int. Cl.$^6$ ............................................. A61B 19/00
[52] U.S. Cl. .................................. 604/406; 604/252; 141/392; 141/286; 210/406; 210/472
[58] Field of Search ............... 604/190, 247, 248, 249, 604/251, 252, 257, 403, 405, 406; 141/57, 59, 118, 286, 295, 297, 298–300, 309, 325, 331, 392; 210/323.1, 345–348, 454, 453, 457, 472, 473–475, 498, 406

[56] References Cited

U.S. PATENT DOCUMENTS

| | | | |
|---|---|---|---|
| 3,726,795 | 4/1973 | Edwards | 141/330 |
| 4,092,246 | 5/1978 | Kummer | 604/190 |
| 4,262,671 | 4/1981 | Kersten | 604/251 |
| 4,343,305 | 8/1982 | Bron | 604/251 |
| 4,453,927 | 6/1984 | Sinko | 604/190 |
| 5,141,639 | 8/1992 | Kraus et al. | 210/406 |
| 5,201,722 | 4/1993 | Moorehead et al. | 604/257 |

OTHER PUBLICATIONS

Cordis Brochure, Apr. 1989.

*Primary Examiner*—C. Fred Rosenbaum
*Assistant Examiner*—Ronald K. Stright, Jr.
*Attorney, Agent, or Firm*—Shoemaker and Mattare, Ltd.

[57] ABSTRACT

A burette top vent which resists air blockage includes a peripherally skirted cap having a generally planar circular base transfixed by a short integral tube having an upper portion to which tubing from a source of fluid may be attached and a lower portion from which fluid can drip into the burette. The base is perforated by an array of arcuate slots that permit air to enter the burette, and the bottom surface of the base has a shallow annular relief intersecting the slots. A ring-shaped hydrophobic filter disk hermetically affixed beneath the relief. The relief prevents the filter disk from lying flush against the bottom surface of the base.

5 Claims, 2 Drawing Sheets

AIR INLET FILTER FOR BURETTE TOP

BACKGROUND OF THE INVENTION

This invention relates generally to fluid handling a medical environment, and more particularly to a burette top having an air filter that resists blockage better than prior devices.

For years there has been a problem in the medical industry with burette assemblies being tilted so that; the filter paper in the air inlet filter becomes wetted. Once this happens, the filter material, even if hydrophobic, becomes saturated with water or liquid and does not permit air to enter the burette. Without an air vent, a burette assembly will not function.

Some current burette assemblies have a molded top having a cylindrical port on top which accepts and air inlet filter assembly that is press fit onto the port. This arrangement provides filtered air flow to the interior of the burette assembly. Under normal operation, this design is satisfactory, but if the burette is tilted horizontal, for example, while a patient is being transferred, fluid from the burette may wet the filter. Even when the burette is returned to its upright position, fluid may not leave the port, because of surface tension, and the filter will remain blocked, creating negative pressure that prevents the burette system from operating. This can be a serious problem, depending on which part of the body to which the burette is connected. Nurses are trained not to tilt burette assemblies, but accidents are frequent.

SUMMARY OF THE INVENTION

An object of the invention is to improve venting of medical burettes, particularly when a burette is inverted.

A related object is to avoid drainage failure caused by a non-functioning filter.

These and other objects are attained by a burette top including a peripherally skirted cap having a generally planar circular base transfixed by a short integral tube having an upper portion to which tubing from a source of fluid may be attached and a lower portion from which fluid can drip into the burette. The base is perforated by an array of arcuate slots that permit air to enter the burette, and the bottom surface of the base, otherwise flat, has a shallow annular relief intersecting the slots. A ring-shaped hydrophobic filter disk is hermetically affixed beneath the relief. The relief keeps the filter disk from lying flush against the bottom surface of the base.

BRIEF DESCRIPTION OF THE DRAWINGS

In the accompanying drawings.

Figure 1:
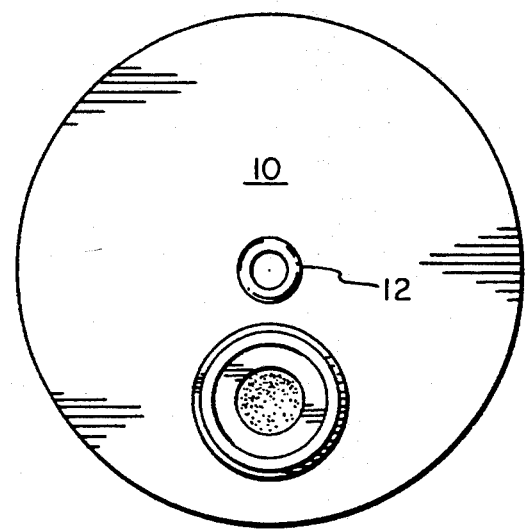
FIG. 1 is a top plan view of a prior burette top.
Figure 2:
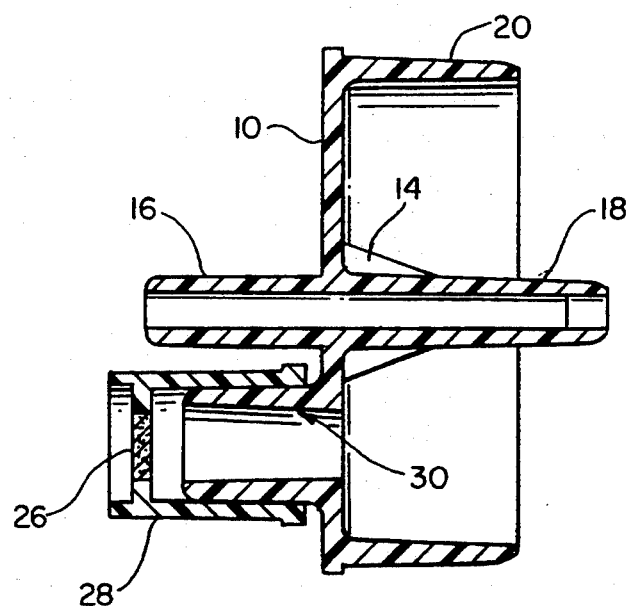
FIG. 2 is a sectional view taken on the plane 2—2 in FIG. 1.

The burette top depicted in FIGS. 1 and 2 comprises a generally planar base 10 having a skirt 20 and an upwardly extending spout or port 30 which serves as an air vent. The vent port is covered by a cap 28 containing a small air filter 26 about the size of the port. Liquid from a flexible line enters the inlet 16, and drips out the orifice 18 into the burette. The small air filter is easily wetted if a burette containing liquid is turned sideways, to the orientation of FIG. 2, even briefly. Once the filter is wet, it does not pass air well, and operation of the system with which the burette is associated may be impaired or halted.

DESCRIPTION OF THE PREFERRED EMBODIMENT

Figure 3:
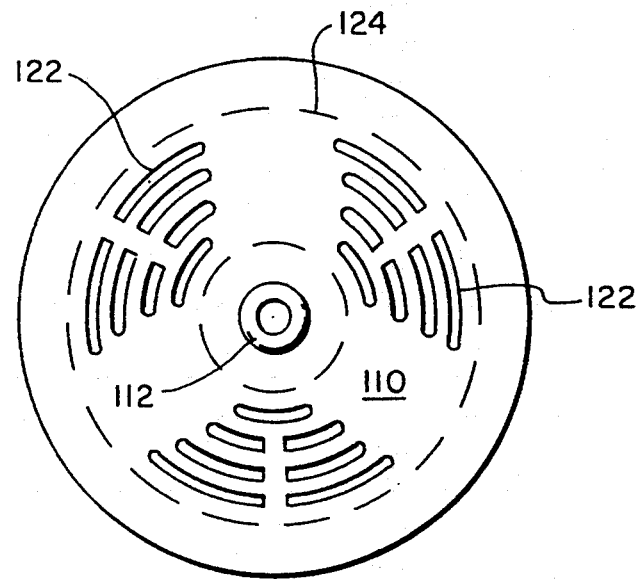
FIG. 3 is a top plan view of a burette top embodying the present invention.
Figure 4:
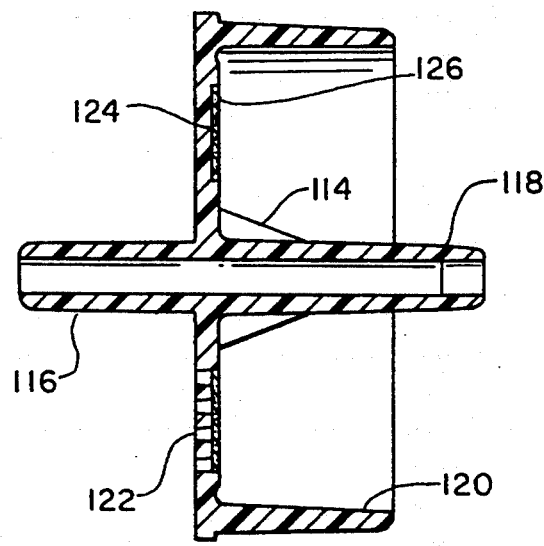
FIG. 4 is a sectional view taken on the plane 4—4 in FIG. 3.

A burette top embodying the invention (FIGS. 3-4) includes an injection-molded rigid thermoplastic cap having a generally planar base 110 transfixed by a short integral tube 112, diagonally buttressed by ribs 114. The upper portion 116 of the tube serves as a port to which tubing from a source of fluid is attached. The lower portion 118 acts as an orifice from which fluid can drip into the burette, which is represented by broken lines in FIG. 4. The slightly tapered skirt 120 engages and seals against the open end of the burette, and holds the top in place.

The base 110 is perforated by an array of arcuate slots 122 that permit air to enter the burette. The underside of the base, which is otherwise substantially flat, has a shallow annular relief 124, and a ring-shaped hydrophobic filter disk 126 is hermetically sealed at its inner and outer peripheries to the base, over the relief. The hermetic sealing, produced by a thermal bonding process such as ultrasonic welding, insures that air cannot bypass the filter. The relief maximizes utilization of the filter surface (except at the inner and outer perimeters of the disk), by preventing the filter disk from bearing flush against the unperforated portions of the base. The hydrophobic filter material preferably is a polymeric material which retains bacteria. The relief, the disk and the tube have a common axis.

In use, the burette top is hermetically affixed at the upper end of a burette, which supported in a vertical orientation by a stand or fixture. The lower end of the burette has a fitting to which an outlet line is affixed. A source line is affixed to the inlet port 116, so that liquid from the source line drips through the tube portion 118 into the burette, and then leaves the burette via the outlet line. The slots 122 admit air to the burette as needed, preventing vacuum buildup in the burette. If the burette is accidentally turned sideways, only part of the filter is apt to be wetted, and the venting function is unaffected. Even if the burette is entirely inverted, wetting the entire filter, it can be cleared fairly rapidly, because the cap lacks any small-diameter port that would retain water by surface tension.

Since the invention is subject to modifications and variations, it is intended that the foregoing description and the accompanying drawings shall be interpreted as illustrative of only one form of the invention, whose scope is to be measured by the following claims.

I claim:

1. A burette top for use with a burette in a medical drainage system, comprising a cap having a generally planar circular base transfixed by a short integral tube having an upper portion providing a port to which tubing from a source of fluid may be attached and a lower portion from which fluid can drip into the burette, said cap having a tapered skirt extending axially downward from the circumference of the base for engaging the open end of the burette, said base being perforated by an array of slots that permit air to enter the burette, the base having a substantially flat bottom surface having a shallow annular relief intersecting said slots, and a ring-shaped filter disk situated beneath the relief, whereby the relief prevents most of the filter disk from lying flush against the bottom surface of the base.

2. The invention of claim 1, wherein said filter disk is made of a hydrophobic material.

3. The invention of claim 2, wherein said filter disk material is a material which retains bacteria.

4. The invention of claim 1, wherein said filter disk has inner and outer peripheries on either side of said relief, and is bonded to said base around both said peripheries, forming hermetic seals.

5. The invention of claim 1, wherein said relief, said disk and said tube have a common axis.

* * * * *